Patented July 12, 1932

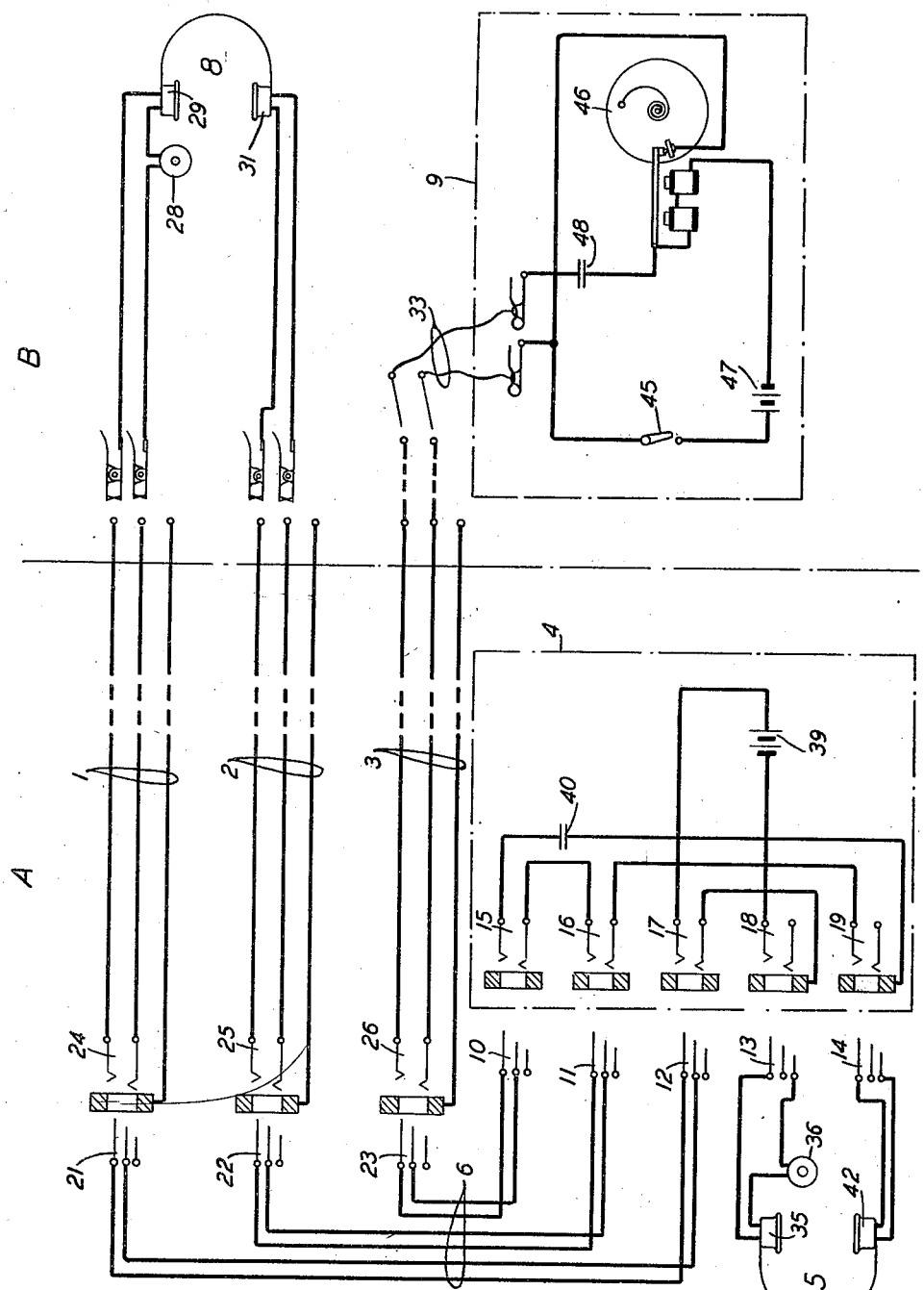

1,867,368

UNITED STATES PATENT OFFICE

ROBERT F. MASSONNEAU, OF SCARSDALE, NEW YORK, ASSIGNOR TO BELL TELEPHONE LABORATORIES, INCORPORATED, OF NEW YORK, N. Y., A CORPORATION OF NEW YORK

TESTING SYSTEM

Application filed January 6, 1931. Serial No. 506,864.

This invention relates to electrical testing systems and particularly to an arrangement for testing telephone conductors for continuity between two points on the conductor.

An object of the invention is to render the testing of conductors more simple and convenient for the test men by simplifying the testing equipment.

Heretofore testing systems have been provided whereby the test man at one point may signal the test man at a distant point and establish a talking connection for the control of the testing.

It is a feature of this invention to provide such a talking connection between the test men at the two points in combination with means whereby the continuity test may be performed simultaneously with the conversation that may be carried on between the two test men over said talking connection. To carry out this feature of the invention equipment is provided whereby a receiver and transmitter of each test man may be connected to a source of current and a separate pair of talking conductors, while another receiver of each test man may be connected through a separate pair of conductors and the conductors to be tested in series with a signal producing device and a condenser so that the test men may carry on a conversation and at the same time listen to a continuity test.

This invention has been illustrated in the accompanying drawing in which three lines 1, 2 and 3 have been shown connecting a position A and another position B. These positions may be a switchboard position and a terminal point at a main distributing frame.

At position A a test box 4 (in a dotted line enclosure) contains a battery, a condenser and jacks for connecting a test man's telephone set 5 to cords 6, which in turn may be connected to jacks of lines 1, 2 and 3 when testing is to begin. In position B another test man's telephone set 8, is shown with a signal producing device 9 (in a dotted line enclosure) comprising a key for closing a circuit, a battery, an interrupting device and a condenser.

Referring now to the operation of this testing device, the line 1 will be used for a talking and listening connection, while line 2 will be used in connection with a listening connection extending over the line 3, the continuity of which will be tested. To begin the test the plugs 10, 11, 12, 13 and 14 may be connected to jacks 15, 16, 17, 18 and 19 respectively of the test box 4 and the plugs 21, 22 and 23 of the cords 6 may be inserted in the jacks 24, 25 and 26 of lines 1, 2 and 3 respectively. The tip and ring conductors of the line 1 may be connected to the transmitter 28 and receiver 29 of the set 8. The tip and ring conductors of line 2 may be connected to receiver 31 of set 8. The tip and ring conductors of line 3 to be tested may be connected to the device 9 through leads 33. After these connections have been made a talking circuit will have been completed between the test man's telephone set 5 at office A and the test man's telephone set 8 at position B, as follows: From battery 39 to tip terminals of jack 18 and plug 13, receiver 35, transmitter 36, ring terminals of plug 13 and jack 18, ring terminals of jack 17, plug 12, plug 21 and jack 24, ring conductor of line 1, transmitter 28, receiver 29, tip conductor of line 1, tip terminals of jack 24, plug 21, plug 12 and jack 17, to battery 39. The test men may retain this connection during the test for conversation relating to the test, as well as the connection through line 2, to be described hereinafter, while the connections for lines to be tested will be shifted from the first line 3 to other lines in succession.

The listening and testing circuit completed through lines 2 and 3 may now be traced as follows: From the tip conductor of line 3, tip terminals of jack 26, plug 23, plug 10 and jack 15, condenser 40, ring terminals of jack 19 and plug 14, receiver 42, tip terminals of plug 14 and jack 19, ring terminals of jack 16, plug 11, plug 22 and jack 25, ring conductor of line 2, receiver 31, tip conductor of line 2, tip terminal of jack 25, plug 22, plug 11 and jack 16, ring terminals of jack 15, plug 10, plug 23, jack 26, ring conductor of line 3, lower lead of the pair 33, through the signal producing device 9 to tip conductor of line 3. When the button or switch 45 of the device 9 is actuated this test circuit will receive an alternating current signal produced by the interrupter 46, battery 47 and condenser 48. If line 3 under test is transmitting this signal it will be heard by both test men in their receivers 42 and 31. If the test is satisfactory the plug 23 and leads 33 are shifted to the next line to be tested.

It will be noted that the receivers 35 and 42 are connected with a band to form a headset and that the receivers 29 and 31 are also connected to form a headset. Thus if the test men carry these headsets they may converse and listen over line 1 through their respective transmitters 36 and 28 and receivers 35 and 29, while at the same time they may listen to tests over line 3 and succeeding lines.

While this invention has been illustrated in connection with but a single system it should be understood that this is merely illustrative of the invention and that it may readily be applied to a number of other circuit arrangements without departing from the spirit of the invention.

What is claimed is:

1. In a testing device, means for establishing a talking and listening connection, and means for establishing a separate testing connection comprising a pair of conductors for listening to a test, a signal producing device, a pair of conductors to be tested, a pair of receivers and a condenser all connected in a serial relation.

2. In a testing device, a talking and listening connection, and a separate listening connection including a line to be tested and means for testing the continuity of said line comprising means for producing a signal over said line and means for listening to said signal.

3. In a testing device, a talking and listening connection, a separate listening connection including a line to be tested and means for testing the continuity of said line comprising means for producing a signal over said line and means for listening to said signal, and means for establishing said talking and listening connection and the separate testing connection simultaneously.

4. A testing device comprising a talking and listening line and a line to be tested, a headset at each end of said lines with one receiver in each line, a transmitter at each end of the talking and listening connection and a battery in the talking and listening connection, and a signal producing device and a condenser in the line to be tested.

5. A testing device comprising a talking and listening line, another line, a line to be tested, a pair of headband receivers at each end of said lines with one receiver of each pair included in the talking and listening line, a transmitter at each end of the lines and a battery included in the talking and listening line, a signal producing device and a condenser arranged with the other receivers of said pairs in a series connection through said line to be tested and said other line.

6. In a testing device, a talking and listening line, a separate listening line and a line to be tested, a test man's telephone set comprising two receivers and a transmitter at one end of said lines, a test man's telephone set comprising two receivers and a transmitter at the other end of said lines, a signal producing device at said other end of the lines, means at said other end of said lines for connecting said signal producing device to the line to be tested, the transmitter and one receiver to the talking and listening line and the other receiver to the separate listening line, and means at the opposite end of said lines for connecting the transmitter and one receiver to the talking and listening line in series with the other tansmitter and receiver, a battery, and a condenser at said opposite end of the lines and means for connecting the other receiver, said battery and said condenser in series with the listening line, and the line to be tested.

7. In a testing system, a first testing position, a second testing position, a talking and listening line between said positions, a separate listening line between said positions and a separate line between said positions to be tested, a test man's telephone set comprising a transmitter and two receivers at each position, a signal producing device at the second position, means at the second position for connecting a receiver and a transmitter in series with the conductors of the talking and listening line, means for connecting the other receiver at said second position in series with the conductors of the separate listening line, means for connecting the signal producing device in series with the conductors of the line to be tested, a test box at said first position comprising a condenser, a source of direct current and a circuit arrangement including a plurality of jacks, three cords ending in the plugs at each end, jacks connected to said talking and listening line, separate listening line and the line under test at said first position, a plug connected to one receiver and the transmitter at said first position and another plug connected to the other receiver at said first position, said jacks, plugs and circuit arrangement therefor arranged so that connections may be established through the transmitter and the receiver associated therewith in series with the talking and listening line conductors and so that the conductors of the separate listening line and the line under test may be connected in series with the other receiver the condenser and the source of direct current at said first position.

8. A testing device comprising a talking and listening line and a line to be tested, a headset at each end of said lines with one receiver connected in each line, a transmitter connected at each end of the talking and listening line and a battery connected in the talking and listening line, a condenser connected in the line to be tested, a signal producing device, and means for connecting the signal producing device to said line to be tested for the testing thereof.

9. A testing device comprising a talking and listening line, another line, a line to be tested, a pair of headband receivers at each end of said lines with one receiver of each pair included in the talking and listening line, a transmitter at each end of the lines and a battery included in the talking and listening line, a condenser arranged with the other receivers of said pairs in a series connection through said line to be tested and said other line, a signal producing device, and means for connecting said signal producing device to said line to be tested for the testing hereof.

In witness whereof, I hereunto subscribe my name this 5th day of January, 1931.

ROBERT F. MASSONNEAU.